United States Patent [19]

Kashima et al.

[11] Patent Number: 4,876,433
[45] Date of Patent: Oct. 24, 1989

[54] INVERTER CONTROLLED-TYPE POWER SOURCE FOR ARC WELDING

[75] Inventors: Takayuki Kashima, Fujisawa; Akira Sakabe, Urawa; Yoshifumi Yamanaka, Hokkaido, all of Japan

[73] Assignee: Hitachi Seiko, Ltd., Tokyo, Japan

[21] Appl. No.: 213,140

[22] Filed: Jun. 29, 1988

[51] Int. Cl.⁴ .............................................. B23K 9/09
[52] U.S. Cl. ............................ 219/130.51; 219/130.4
[58] Field of Search ........... 219/130.4, 130.51, 137 PS

[56] References Cited

U.S. PATENT DOCUMENTS 3,780,258  12/1973  Iceland et al. .................. 219/130.4
4,485,293  11/1984  Tabata et al. ................. 219/130.51

FOREIGN PATENT DOCUMENTS 63-13673  1/1988  Japan .
63-13677  1/1988  Japan .

Primary Examiner—Clifford C. Shaw
Attorney, Agent, or Firm—Antonelli, Terry & Wands

[57] ABSTRACT

An arc welding power source supplies a high voltage for the reignition of an arc after the polarity reversal of a welding current to prevent the destruction of circuit elements and ensure the stable and positive polarity reversal despite its reduced size, and also the occurrence of a spike voltage in a main circuit during the polarity reversal of a large current or alternatively the welding current during the polarity reversal is controlled to suppress a spike voltage during the current reversal.

7 Claims, 7 Drawing Sheets

INVERTER CONTROLLED-TYPE POWER SOURCE FOR ARC WELDING

BACKGROUND OF THE INVENTION

1. FIELD OF THE INVENTION

The present invention relates to a power source for arc welding and more particularly to an inverter controlled-type power source for arc welding which is suited for AC TIG welding purposes and capable of suppressing any excessively large transient voltage and stably and reliably effecting the polarity reversal of an output current.

2. DESCRIPTION OF THE RELATED ART

Recently, AC-DC power sources for arc welding of the type reduced in size and weight through the use of inverter control have been put in practical use. In the case of AC TIG welding, however, during the current reversal, particularly when the polarity of the current flowing between the electrode and the base metal is reversed from one polarity where the electrode side is negative (positive polarity) to the other polarity where the electrode side is positive (negative polarity), there is a tendency for the arc to be extinguished. Thus, there have been used arc welding power sources of the type including a reignition aiding circuit for applying a high-frequency high voltage across the electrode and the base metal to prevent the occurrence of arc extinction. FIG. 1 of the accompanying drawings shows the circuit construction of this type of power source for arc welding.

In FIG. 1, after the AC voltage applied to an input terminal 1 from a commercial power supply has been converted to a DC voltage by a rectifier 2, the DC voltage is converted to a high-frequency AC voltage (e.g., 20 kHz) and applied to a main transformer 4 through an input converter 3. After the AC voltage has been reduced to a suitable voltage for welding purposes by the main transformer 4, the reduced voltage is applied through a current detector 5 to an output rectifier 6 to produce a DC voltage, which is smoothed by a reactor 7 and a capacitor 8. The DC voltage is converted again to an AC voltage by an output inverter 9 and then supplied to an arc load (not shown) through an output terminal 10.

In this case, a current control circuit 13 determines a desired output current based on a preset value of the output current inputted from an output current setting means 14, the desired output current is applied to an error amplifier 12 which compares the desired output current with the actual output current detected by a current detector 5 thereby producing an error signal between them after being amplified. The amplified error signal is applied to a pulse width control circuit 11 which controls the pulse width of the input inverter 3 so as to reduce the error signal substantially to zero. On the other hand, a rectangular wave generator 16 generates a reference rectangular signal having a repetition frequency and a duty cycle which are respectively corresponding to the preset values of reversing frequency setting means 17 and positive polarity negative polarity ratio setting means 18 so that in response to each of the leading and trailing edges of the reference rectangular signal the polarity of the output current is reversed by the output inverter 9 through a drive circuit 24. This relation is shown in FIG. 2. Note that the output inverter 9 includes transistors $T_1$ to $T_4$ and diodes $D_1$ to $D_4$ which are connected in bridge form as shown in FIG. 3 so that an AC output is generated by turning on and off alternately the two paired transistors $T_1$, $T_2$ and $T_3$, $T_4$ in synchronism with the leading and trailing edges of the reference rectangular signal as mentioned previously and a DC output is generated by continuously turning on either one of the two transistor pairs while maintaining the output of the rectangular wave generator 16 at "0" or "1".

In FIG. 1, if an arc cannot be reignited only by the voltage supplied from the main transformer 4 during the polarity reversal of the output current, a transient voltage is produced in the reactor 7 of the output circuit due to a rapid decrease in the load current. The magnitude of this transient voltage is determined by the inductance value of the reactor 7 and the value of the current flowing therein during the polarity reversal. With the circuitry of FIG. 1, the current value during the polarity reversal varies for example over a wide range from 300 A to less than 100 A and the transient voltage produced in the reactor 7 during the polarity reversal also varies correspondingly over a wide range. Thus, a capacitor 8 of a large capacity is required to absorb any excessively large transient voltage to prevent the transistors, etc., of the output inverter 9 from being destructed. Also a reignition aiding circuit 25 of a large capacity is required to supply the required voltage (about over 200 V) for the reignition of an arc when the transient voltage is so small that the voltage on the capacitor 8 does not reach the reignition voltage, thereby increasing the cost of the device. Moreover, there are instances where the inductance value of the reactor 7 is limited to avoid the generation of an excessively large transient voltage thus failing to fully smooth the current ripple and where the increased capacity of the capacitor 8 deteriorates the output control response.

FIG. 3 shows an example of the reignition aiding circuit 25. The circuit of FIG. 3 is designed, by taking into consideration the fact that the AC TIG welding power source of the inverter-controlled type produces a relatively low reignition voltage of about 200 V during the current reversal and that the high frequency superposing method tends to cause radio interference, etc. A high DC voltage (about 200 V) is applied during the current reversal for superimposition on the secondary-side main circuit of the welding power source thereby maintaining the arc. The circuit of FIG. 3 receives a high-frequency AC power from the primary side of the transformer 4 in FIG. 1 and a high DC voltage of about 200 V is produced through a transformer 26, a rectifier 28 and a smoothing capacitor 30. The ends of the capacitor 30 are connected across the output lines of the output rectifier 9 in the welding power source so that when the output current of the output inverter 9 is reversed to reignite an arc, the high DC voltage is applied across an electrode 10 and base metals 34 to maintain the arc.

While the reignition aiding circuit 25 is effective for the stabilization of the AC arc, the current continues to flow in a resistor 32 even after the reignition of the arc causing a voltage drop with the result that it is necessary to increase the current capacity of the components forming a high voltage superposing circuit, e.g., the transformer 26, the rectifier 28, the smoothing capacitor 30 and the resistor 32 and these components are increased in size and weight, thereby ruining the merit of decreasing the size and weight of the welding power source owing to the inverter control and also deteriorating the efficiency.

Also, where the welding is effected with a large current, during the current reversal of the output inverter 9 a spike voltage is caused by the inductance of the main circuit thereby destroying the elements such as the transistors.

SUMMARY OF THE INVENTION

It is a first object of the present invention to provide a power source for arc welding comprising a reignition aiding circuit capable of supplying a high voltage for effecting the reignition of an arc at the polarity reversal of current and suppressing a spike voltage produced in a main circuit during the reversal of a large current, thus preventing the destruction of the circuit elements and ensuring the stable and reliable polarity reversal despite its reduced size.

It is a second object of the invention to provide a power source for arc welding which is designed so that the welding current at the polarity reversal is controlled to suppress a spike voltage produced at the current reversal, thereby preventing the destruction of the circuit elements and ensuring the stable and reliable polarity reversal despite its reduced size.

To accomplish the first object, an arc welding power source according to a first aspect of the invention includes first frequency converting means including a first rectifier for converting a first low-frequency AC voltage to a DC voltage and a first inverter for converting the DC voltage to a second high-frequency AC voltage; a transformer for converting the second AC voltage to a third AC voltage of a suitable voltage for welding; second frequency converting means including a second rectifier for converting the third AC voltage to a DC voltage and a second inverter for converting the rectified DC voltage to a controlled AC voltage; means for applying the controlled AC voltage generated from the second frequency converting means to materials to be welded together to supply a welding current to the materials; a capacitor connected to the output side of the second rectifier; means for charging the capacitor; and switch means connected between the charging means and the capacitor and adapted to be turned on for a given period of time at the timing of polarity reversal of the welding current.

To accomplish the second object, an arc welding power source according to a second aspect of the invention includes first frequency converting mean including a first rectifier for converting a first low-frequency AC voltage to a DC voltage and a first inverter for converting the DC voltage to a second high-frequency AC voltage; a transformer for converting the second AC voltage to a third AC voltage of a suitable voltage for welding; second frequency converting means including a second rectifier for converting the third AC voltage to a DC voltage and a second inverter for converting the rectified DC voltage to a controlled AC voltage; means for applying the controlled AC voltage generated from the second frequency converting means to materials to be welded together to supply a welding current to the materials; means for selectively setting the magnitude of the welding current to a first set value suitable for the welding of the materials and a second set value suitable for positively effecting the polarity reversal of the welding current; and means for controlling the operation of the welding current setting means such that the second set value is selected during the polarity reversal of the welding.

DESCRIPTION OF THE PREFERRED EMBODIMENTS

Figure 1:
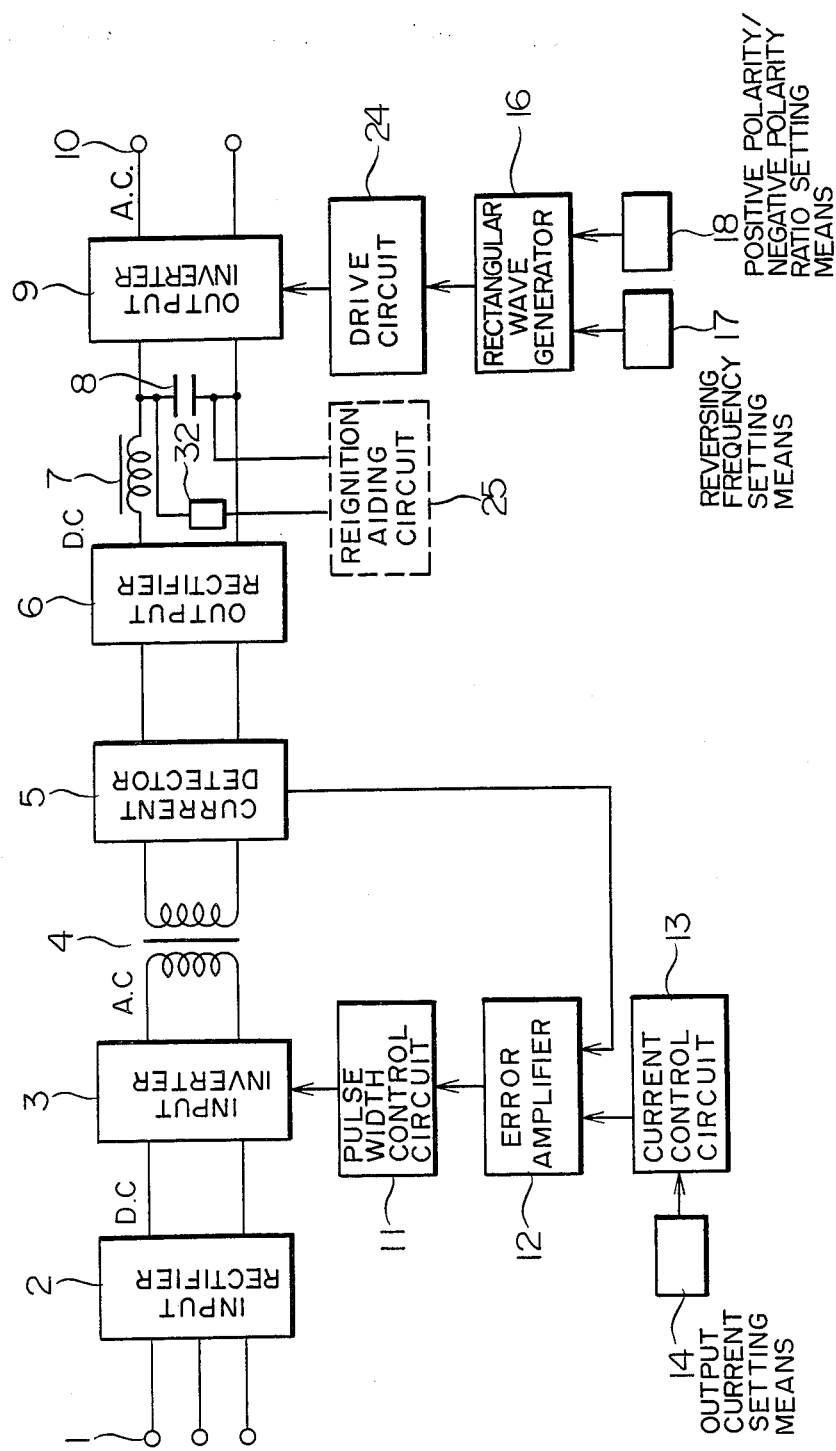
FIG. 1 is a block diagram showing the circuit construction of a conventional power source for arc welding.
Figure 2:
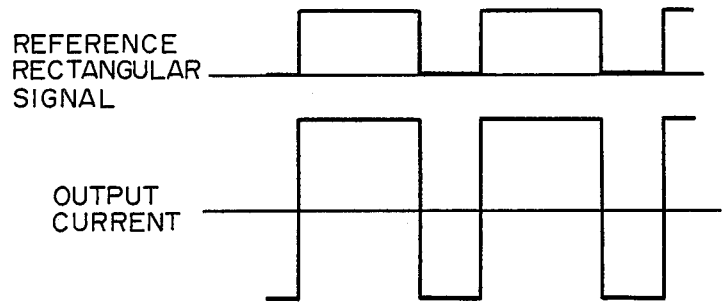
FIG. 2 is a waveform diagram for explaining the welding current control operation of the arc welding power source of FIG. 1.
Figure 3:
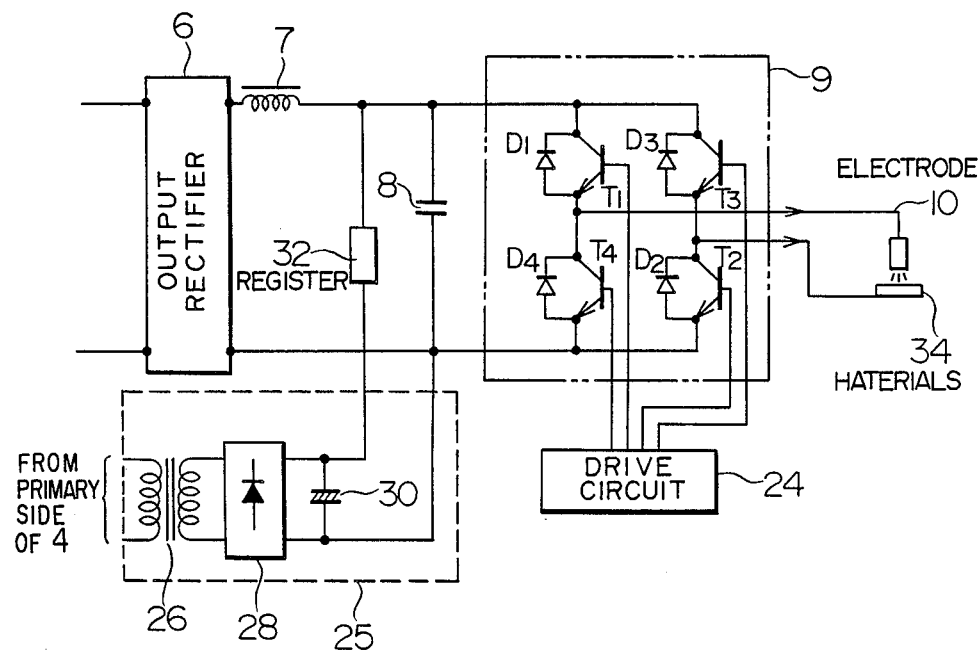
FIG. 3 is a diagram showing the conventional reignition aiding circuit.
Figure 4:
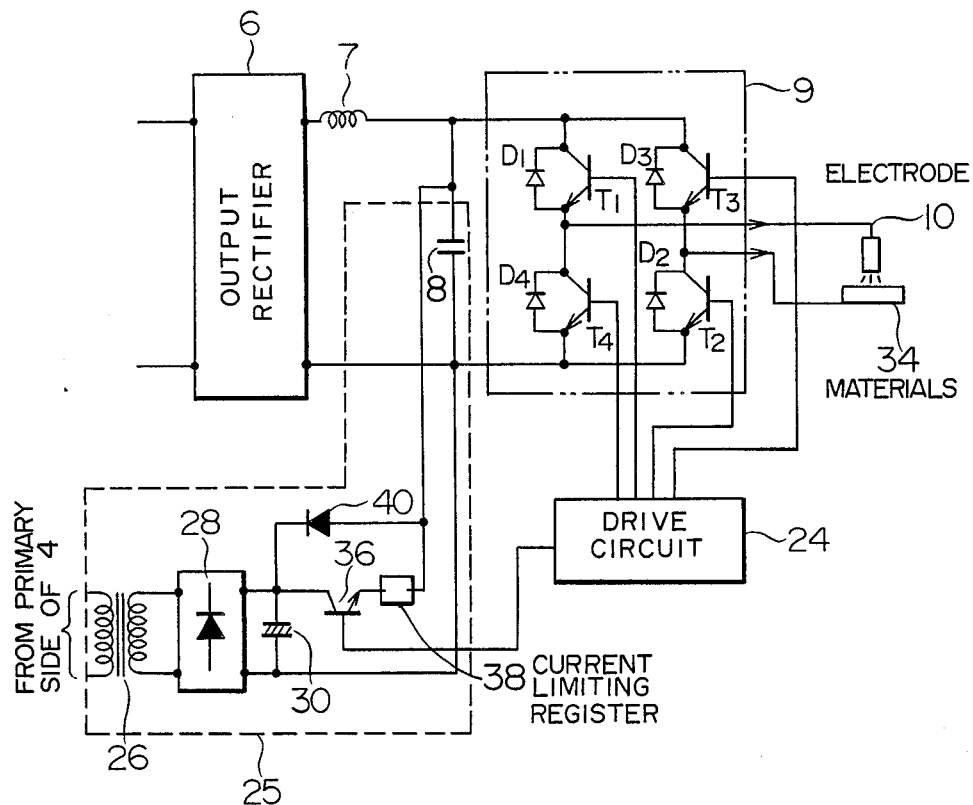
FIG. 4 is a diagram showing a reignition aiding circuit of an arc welding power source according to a first embodiment of the present invention.

Referring to FIG. 4, a reignition aiding circuit in an arc welding power source according to a first embodiment of the invention will be described. The first embodiment is identical with the arc welding power source of FIG. 1 except the provision of a reignition aiding circuit 25. In the Figure, numeral 26 designates a transformer for receiving the power from the primary side of the high-frequency transformer 4 of FIG. 1 to convert it to an AC voltage corresponding to a DC voltage of 200 V, for example, which is superposed on the primary side of the inverter 9 during the polarity reversal of the welding current, 28 a rectifier for rectifying the output of the transformer 26 to produce a DC output, and 30 a smoothing capacitor. The DC output of the rectifier 26 charges the capacitor 8 through a switching element 36 including a power transistor or the like and a current limiting resistor 38. The capacitor 8 is connected across the input lines of the inverter 9, and the base of the power transistor 36 receives a control signal from the drive circuit 24 for controlling the timing of the turning-on of the transistors of the inverter 9. This control signal is a rectangular signal which goes to a high level in response to a signal generated from the drive circuit 24 to change over the conduction of the transistors of the inverter 9 and continues the high level for a given time interval. The transistor 36 is at its ON state when this control signal is at the high level. The time interval during which the control signal is at the high level is selected to be substantially the same as the required time interval for charging the capacitor 8.

With the construction described above, when alternately turning on and off the two paired transistors $T_1$, $T_2$ and $T_3$, $T_4$ of the output inverter 9 to produce an AC arc between the electrode 10 and the base metals 34, if the power transistor 36 is turned on for the previously-mentioned given time interval of the polarity reversal of the current from the inverter 9, the capacitor 8 is charged to a high voltage (about 200 V) by the power supplied from the high-frequency transformer 26 as mentioned previously so that the charged voltage of the capacitor 8 is applied across the electrode 10 and the base metal 34 to aid the polarity reversal of the current from the output inverter 9 and it serves to maintain the arc. Also, any spike voltage produced by the inductance of the main circuit at the current reversal is absorbed by the capacitor 8.

At the polarity reversal of a large current, the spike voltage produced in the main circuit is increased and the voltage on the capacitor 8 is increased correspondingly. At this time, if the charge on the capacitor 8 is fed back to the power supply side through a diode 40 connected in parallel with the power transistor 36 and the current limiting resistor 38 to charge the smoothing capacitor 30, the voltage on the capacitor 8 can be prevented from increasing abnormally. Where an upper limit for spike voltage has been determined, this can be dealt with by increasing somewhat the capacity of the capacitor 8 and the diode 40 can be eliminated.

The power transistor 36 may be turned on just before the current reversal. Further, in the present embodiment, the output inverter includes a single power supply full-bridge circuit, the embodiment is also applicable to a case where the output inverter includes a two-power supply half-bridge circuit and moreover it can be of the AC/DC type.

Figure 5:
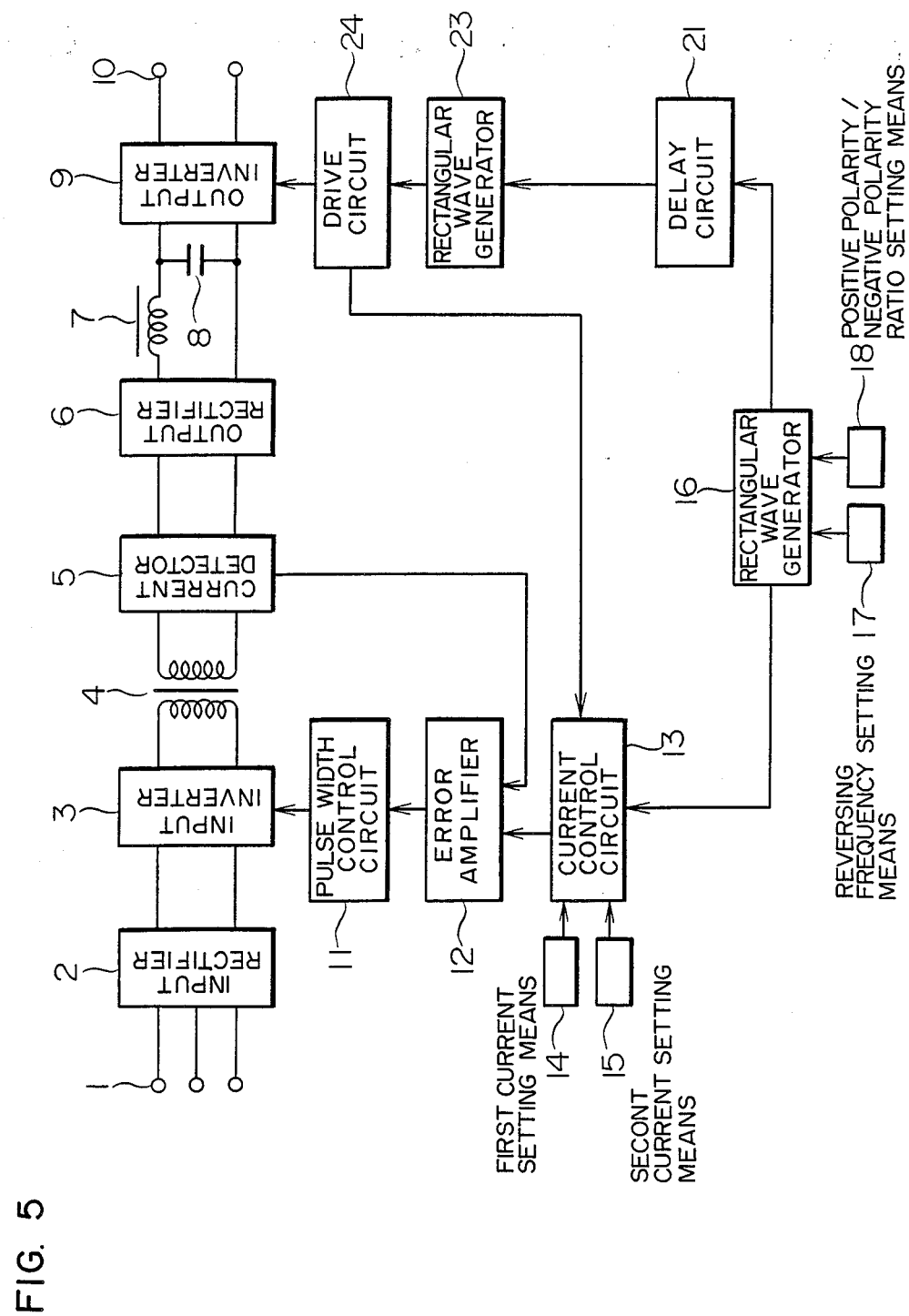
FIG. 5 is a diagram showing the circuit construction of an arc welding power source according to a second embodiment of the invention.

A second embodiment of the invention will now be described with reference to FIG. 5. The second embodiment is designed so that the magnitude of a welding current during its polarity reversal is controlled so as to suppress a spike voltage produced in a main circuit and ensure the stable and positive polarity reversal. In FIG. 5, the AC voltage applied to an input terminal 1 from a commercial power supply is converted to a DC voltage by an input rectifier 2 and the DC voltage is converted to a high-frequency AC voltage (e.g., 20 kHz) by an input inverter 3 which in turn applies it to a main transformer 4. After the AC voltage has been dropped to a suitable voltage for welding by the main transformer 4, the AC voltage is converted to a smoothed DC voltage by an output rectifier 6, a reactor 7 and a capacitor 8 through a current detector 5 and the DC voltage is again converted to an AC voltage by an output inverter 9 which in turn supplies it to an arc load (not shown) through an output terminal 10. This operation is the same as the conventional power source shown in FIG. 1.

In this embodiment, the first current setting means 14 is provided to preset a desired normal output current value which may be any current value in a range, for example, from 300 A to less than 100 A depending on the welding condition. On the other hand, a second current setting means 15 is provided to preset a desired current value for the polarity reversal (hereinafter referred to as a reserval current value). The reversal current value is determined, for example, at 100 A depending on the specifications of a welding machine and need not be variable. The set values of the current setting means 14 and 15 are transmitted as voltage signals to a current control circuit 13 so that one of the set values selected by the current control circuit 13 is compared with the detected value of the current detector 5 by an error amplifier 12 and the output pulse width of the input inverter 3 is controlled by a pulse width control circuit 11 to make the two values substantially equal to each other.

On the other hand, a rectangular wave generator 16 produces a rectangular signal (hereinafter referred to as a reference rectangular signal) having a repetition frequency and a duty cycle which are respectively corresponding to the set values of reversing frequency setting means 17 and positive polarity 1 negative polarity ratio setting means 18. This rectangular wave generator 16 is well known as a function generator in the art. The current control circuit 13 operates, in response to each of the leading and trailing edges of the reference rectangular signal, to change the output current set value to be compared with the detected value of the current detector 5 from the set value of the first current setting means 14 to the set value of the second current setting means 15 at a given time constant. Also, there is provided a delay circuit 21 which provides a delay time $t_D$ of a length corresponding to or slightly longer than the given time constant from the positive-going and negative-going transistions of the reference rectangular signal, so that when the delay circuit 21 generates a signal indicative of the lapse of the delay time $t_D$, upon receipt of this signal a rectangular wave generator 23 generates a rectangular signal which is delayed in phase from the reference rectangular signal by the delay time $t_D$ (hereinafter referred as a delayed-phase rectangular signal). The rectangular wave generator 23 is composed for example of a flip-flop which is set and reset in response to the signal from the delay circuit 21. A drive circuit 24 generates an actuation signal in response to each of the leading and trailing edges of the delayed-phase rectangular signal. This actuation signal turns the transistors $T_1$ and $T_2$ on and the transistors $T_3$ and $T_4$ off in the inverter 9 of FIG. 4 in response to the leading edge of the delayed-phase rectangular signal, whereas the actuation signal turns the transistors $T_1$ and $T_2$ off and the transistors $T_3$ and $T_4$ on in response to the trailing edge of the same signal, thereby effecting the polarity reversal of the output current. The current control circuit 13 receives the actuation signal from the drive circuit 24 to restore the output current set value to be compared with the detected value of the current detector 5 to the set value of the first current setting means 14.

Figure 6:
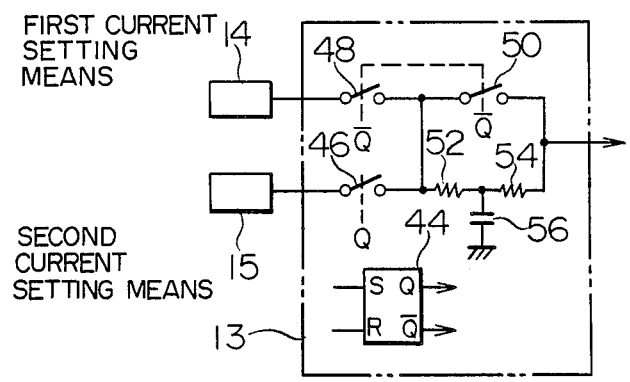
FIG. 6 is a diagram showing the circuit for controlling the set values of the welding current in the arc welding power source of FIG. 5.

Referring to FIG. 6, there is illustrated an example of the construction of the current control circuit 13. This circuit is composed of a flip-flop 44 which is set in response to each of the leading and trailing edges of the reference rectangular signal to generate a Q=1 signal and reset by the actuation signal from the drive circuit 24 to generate a $\overline{Q}$=1 signal, an analog switch 46 which is turned on by the Q=1 output of the flip-flop 44, analog switches 48 and 50 which are turned on by the $\overline{Q}$=1 output of the flip-flop 44, resistors 52 and 54 and a cpacitor 56. Thus, when the reference rectangular signal goes to the high level or the low level so that the analog switch 46 is turned on and the analog switches 48 and 50 are turned off, a voltage which changes from the voltage corresponding to the set value of the first current setting means 14 to the voltage corresponding to the set value of the second current setting means 15 in accordance with the time constant of the resistor 52 and the capacitor 56, is generated as a signal corresponding to the first current set value through the resistor 54. Also, the flip-flop 44 is reset by the actuation signal from the drive circuit 24 so that the analog switches 48 and 50 are turned on and the analog switch 46 is turned off, thus short-circuiting the resistors 52 and 54 and the capacitor 56 and thereby instantaneously returning the output current set value to the set value of the first current setting means 14.

Figure 8:
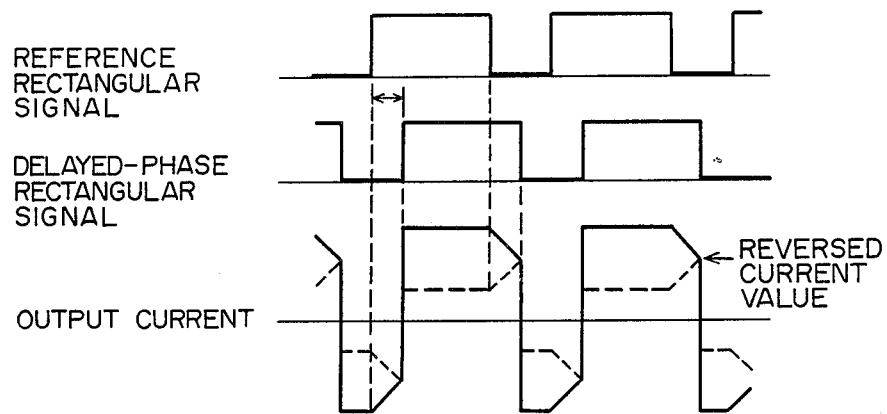
FIG. 8 is a waveform diagram for explaining the operation of arc welding power source of FIG. 7.

The above-described operation of the embodiment is illustrated in FIG. 8 in which the solid lines of the output current waveform show cases where the stationary output current set value is greater than the reversed current value and the broken lines show cases where the stationary output current set value is smaller than the reversed current value. In either case, substantially the same transient voltage is generated in the reactor 7 during the polarity reversing operation and the capacitor 8 can be charged up to the required voltage for reignition. Thus, there is no danger of excessively charging the capacitor 8 and destroying the transistors, etc., of the output inverter 9.

It is to be noted that while, in the above-described embodiment, the positive-polarity and negative-polarity output current values are equal to each other, to vary the output current value depending on the polarity can be easily realized by arranging the system so that a stationary output current value set by the current control circuit 13 in response to an actuation signal generated from the drive circuit 24 upon the positive-going transition of a delayed-phase rectangular signal is different from a stationary output current value set in response to an actuation signal generated upon the negative-going transition of the delayed-phase rectangular signal. Also, if both of the outputs of the rectangular wave generators 16 and 23 are maintained at "0" or "1", a DC output is generated from the output terminal 10. In other words, the ac welding power source shown in FIG. 5 can be used as an AC/DC power source.

Figure 7:
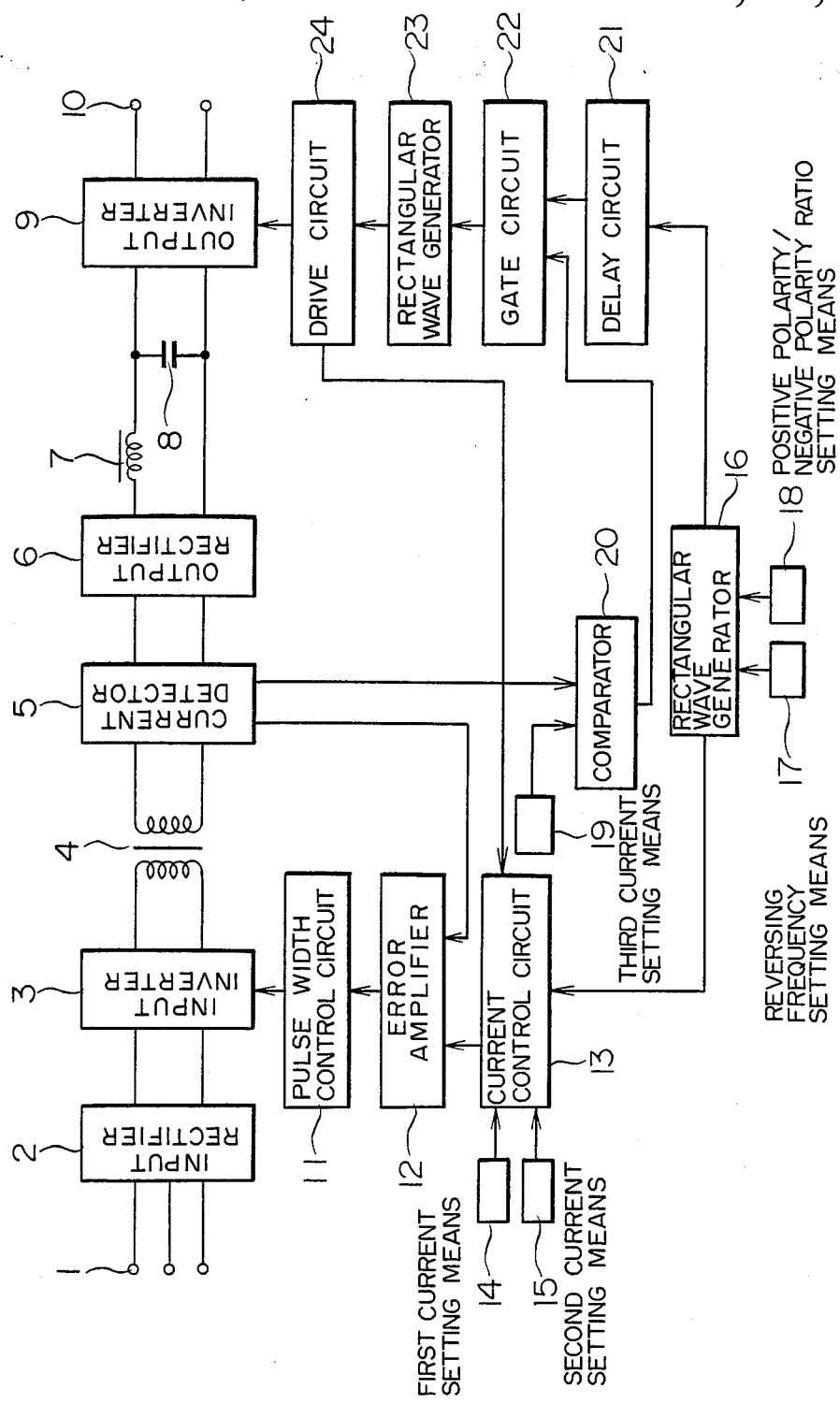
FIG. 7 is a block diagram showing the circuit construction of a modification of the second embodiment.

Referring to FIG. 7, there is illustrated a block diagram showing the circuit construction of a modification of the second embodiment of the invention. In FIG. 7, the component parts which are identical or equivalent to those of FIG. 5 are designated by the same reference numerals and their repeated explanation will be omitted. In FIG. 7, an upper limit reversed current value higher than the reversed current set value of the second current setting means 15 is preset in third current setting means 19 and a comparator 20 compares the preset upper limit reversed current value with the detected value of the current detector 5 to generate a "1" signal when the current detected value is less than the upper limit reversed current value. A gate circuit 22 functions in a manner that an output signal "1" of the delay circuit 21 indicating the lapse of the given delay time $t_D$ from the positive-going or negative-going transition of a reference rectangular signal is sent to the rectangular wave generator 23 only when there exists the output signal "1" of the comparator 20 indicating that the current detected value is less than the upper reversed current value, thereby causing the rectangular wave generator 23 to generate a delayed-phase rectangular signal. This enables the reversing operation of the output inverter 9 through the drive circuit 24 as previously described in connection with FIG. 5. By virtue of polarity reversal control means formed by the comparator 20 and the gate circuit 22, there is the effect of preventing the occurrence of an excessively large transient voltage due to the polarity reversal effected in a nonstationary condition where there is the flow of a large current exceeding the upper limit reversed current value.

Both the second embodiment and its modification have the below-mentioned peculiar effects.

(a) The stable and reliable polarity reversal of an output current can be effected without causing any excessively large transient voltage. Experiments show that in the case of a welding machine having a rating of 300 A the reversed current value of about 100 A is sufficient and the resulting transient voltage is reduced to half.

(b) When the stationary output current set value is greater than the reversed current value, the range of current variation during the polarity reversal is reduced so that any rapid change in the arc pressure is suppressed and the arc is made more stable.

(c) The range of choice of the reactor and capacitor inserted in the output circuit is increased so that it is possible to increase the inductance value of the reactor and decrease the capacity of the capacitor than previously, thereby improving the current ripple smoothing function and the control response properties.

(d) The reversal aiding circuit 25 can be eliminated with the resulting decrease in the cost, size and weight of the welding power source.

(e) The functions of the embodiment and its modification can be realized by the power source which is simple in circuit construction, high in reliability and low in cost.

(f) A sufficient delay time is ensured for a change of the output current value and therefore a transition from the stationary output current set value to the reversed current value is effected smoothly.

(g) Particularly, in accordance with the modification of the second embodiment, the polarity reversal is not effected unless the actual current flowing in the welding circuit is less than a given value and this has the effect of preventing the circuit elements from being destroyed by an unexpected transient voltage in such unstationary condition where the current is increased rapidly due to a change in the arc length.

In all of the above-described embodiments, the output inverter includes the four switching elements $T_1$, $T_2$, $T_3$ and $T_4$ arranged in bridge connection and the welding current of either polarity flows in series through the two switching elements. Since the arc welding circuit is a low-voltage large-current circuit, the power loss due to the switching elements is large. Also, the output circuit of the main transformer 4 is an inductive circuit including the load cable and a transient voltage is produced during the polarity reversal of the welding current. Therefore, each of the switching elements must be provided with a large number of protective components which are not shown, e.g., a capacitor, resistors, etc., so as to absorb the transient voltage.

Figure 9:
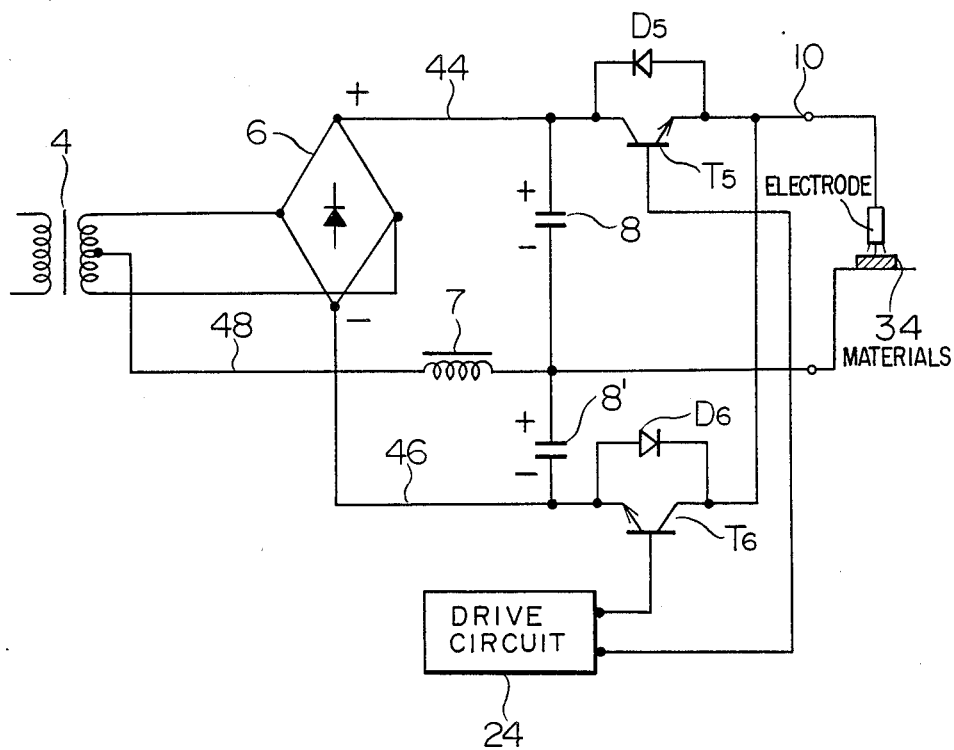
FIGS. 9 and 10 diagrams showing modifications of the output inverter circuit used with the arc welding power source of the invention.
Figure 10:
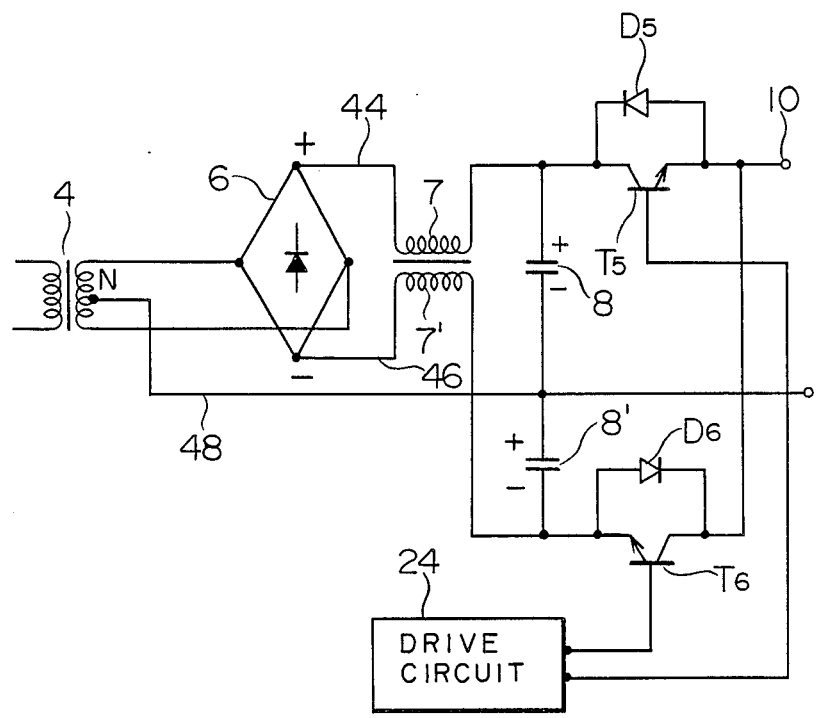

Referring to FIGS. 9 and 10, there are illustrated modified circuits in which in order to avoid the foregoing deficiency the output inverter is composed of two switching elements and a welding current flows through one of the switching elements depending on its polarity. In either of these circuits, the materials 34 to be welded are connected to a line 48 connected to the neutral point N on the secondary winding of the main transformer 4. Also, the DC output produced by rectifying the secondary output of the transformer 4 by the full-wave rectifier 6, has its positive side 44 connected to the electrode 10 through a switching element $T_5$ and its negative side 46 connected to the electrode 10 through a switching element $T_6$. The capacitor 8 is connected between the lines 44 and 48 and a capacitor 8' is connected between the lines 46 and 48. The polarity of the welding current is reversed by controlling the turning-on of the switching elements $T_5$ and $T_6$ through the drive circuit 24 in the same manner as in the case of the previously mentioned embodiments. The circuits of FIGS. 9 and 10 are identical except that in FIG. 9 the reactor 7 is provided on the line 48 which connects the secondary side of the transformer 4 to the materials to be welded and that in FIG. 10 the reactors 7 and 7' are respectively provided on the output lines 44 and 46 of the rectifier 6. With these constructions of the output inverter, the welding current of either polarity flows through corresponding one of the switching elements so that the power loss is decreased and also the protective means is simplified.

We claim:

1. A power source for arc welding comprising:
   first frequency converting means including a first rectifier for converting a first low-frequency AC voltage to a DC voltage, and a first inverter for converting said DC voltage to a second high-frequency AC voltage;
   a transformer for converting said second AC voltage to a third AC voltage suitable for welding;
   second frequency converting means including a second rectifier for converting said third AC voltage to a DC voltage, and a second inverter for converting said rectifier DC voltage to a controlled AC voltage;
   means for applying said controlled AC voltage generated from said second frequency converting means to materials to be welded together to supply a welding current thereto;
   a capacitor connected to an output side of said second rectifier;
   means for charging said capacitor; and
   switching means connected between said charging means and said capacitor so as to be turned on for a predetermined time at a timing of polarity reversal of said welding current.

2. A power source according to claim 1, wherein said second frequency converting means includes a drive circuit for generating a signal commanding the timing of reversal of an output AC current of said second inverter, wherein said charging means includes a second transformer for converting said second AC voltage to a fourth voltage corresponding to a DC voltage to be superposed on the output of said second inverter during the polarity reversal of said welding current, a third rectifier for converting the output of said second transformer to a DC voltage, and means for applying the output of said third rectifier to said capacitor, and wherein said switching means includes a transistor connected to connecting means of said charging means and controlled to be turned on by the timing command signal generated by said drive circuit.

3. A power source for arc welding comprising:
   first frequency converting means including a first rectifier for converting a first low-frequency AC voltage to a DC voltage, and a first inverter for converting said DC voltage to a second AC voltage;
   a transformer for converting said second AC voltage to a third AC voltage suitable for welding;
   second frequency converting means including a second rectifier for converting said third AC voltage to a DC voltage, and a second inverter for converting said rectified DC voltage to a controlled AC voltage;
   means for applying said controlled AC voltage generated from said second frequency converting means to materials to be welded together to apply a welding current thereto;
   means for selectively setting the magnitude of said welding current to either of a first set value suitable for the welding of said materials and a second set value suitable for positively reversing the polarity of said welding current;
   means for controlling the operation of said welding current setting means to select said second set value during the polarity reversal of said welding current; and
   means for inhibiting, at the time of reversing the polarity of the output current from said second inverter, the polarity reversal of said output current when said output current is in excess of a predetermined upper limit value.

4. A power source according to claim 3, wherein said control means includes a flip-flop circuit adapted to be set in response to each of the leading and trailing edges of said reference rectangular waveform and reset in response to the command signal from said drive circuit, and means for causing said setting means to select said second set value in response to a set signal of said flip-flop circuit and to select said first set value in response to a reset signal of said flip-flop circuit.

5. A power source according to claim 3, wherein said second inverter includes a first switching element having an input connected to one of a plurality of output lines for delivering the DC output of said second rectifier, a second switching element having an input connected to another of said output lines, output means having two terminals one of which is connected to an output of each of said first and second switching elements and the other is connected to a neutral point in a secondary winding of said transformer, and a drive circuit for alternately turning said first and second switching elements on in response to desired polarity reversing timings of said welding current.

6. A power source for arc welding comprising:
   first frequency converting means including a first rectifier for converting a first low-frequency AC voltage to a DC voltage, and a first inverter for converting said DC voltage to a second AC voltage;
   a transformer for converting said second AC voltage to a third AC voltage suitable for welding;
   second frequency converting means including a second rectifier for converting said third AC voltage to a DC voltage, a second inverter for converting said rectified DC voltage to a controlled AC voltage, a circuit for generating a reference rectangular waveform having desired leading and trailing edges each corresponding to a desired polarity reversing timing of an output AC current from said second inverter, and a drive circuit for generating a signal for commanding the reversal of polarity of the output current from said second inverter with a given time delay from each of the leading and trailing edges of said reference rectangular signal;
   means for applying said controlled AC voltage generated from said second frequency converting means to materials to be welded together to apply a welding current thereto;
   means for selectively setting the magnitude of said welding current to either of a first set value suitable for the welding of said materials and a second set value suitable for positively reversing the polarity of said welding current;

means for controlling the operation of said welding current setting means to select said second set value during the polarity reversal of said welding current, wherein said control means controls said setting means in such a manner that said setting means selects said second set value in response to each of the leading and trailing edges of said reference rectangular waveform and that said setting means selects said first set value in response to the command signal from said drive circuit; and means whereby at the timing of reversing the polarity of the output current from said second inverter, the polarity reversal of said output current is inhibited when said output current is in excess of a predetermined upper limit value.

7. A power source according to claim 6, wherein said polarity reversal inhibiting means includes means for generating a current signal indicative of the output current from said second inverter, a comparator for comparing an upper limit value signal indicative of said predetermined upper limit value for said output current to generate an effective signal when said current signal is less than said upper limit value signal, a delay circuit for generating a delay signal of said predetermined time delay from each of the leading and trailing edges of said reference rectangular waveform, and a gate circuit for enabling the passage of said delay signal only when said effective signal is present whereby said drive circuit is enabled to operate by said delay signal applied thereto through said gate circuit.

* * * * *